July 20, 1965     K. R. A. WILSON     3,195,842
PARACHUTE
Filed March 3, 1964     2 Sheets-Sheet 1
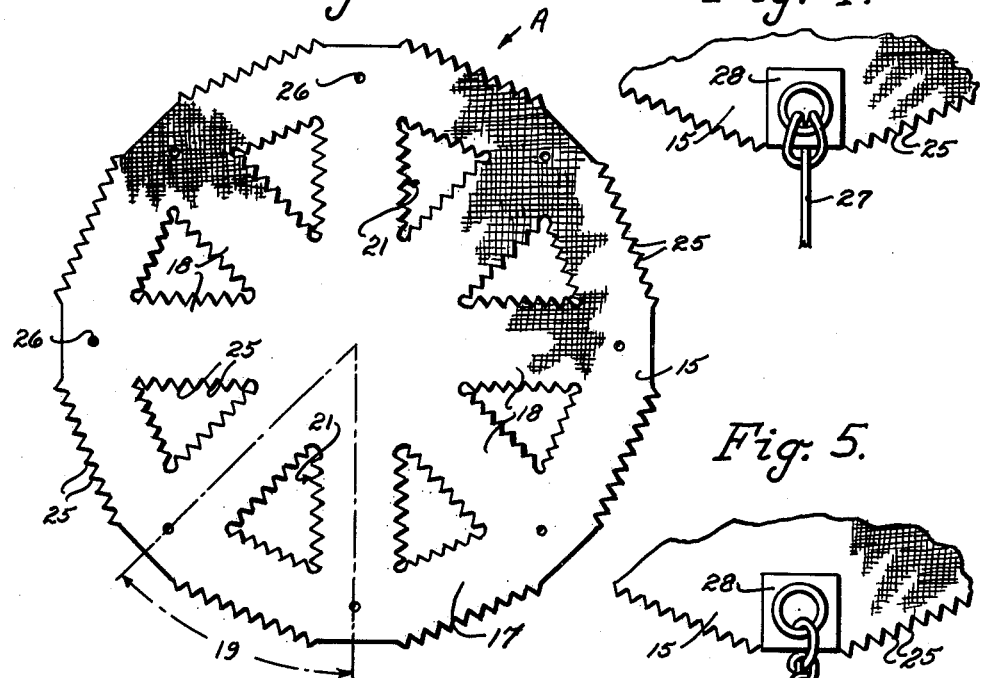
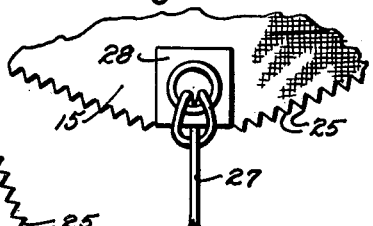
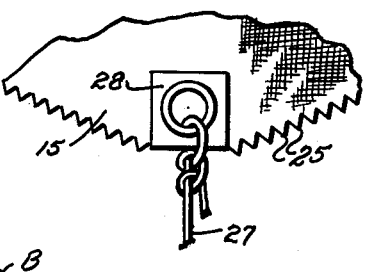
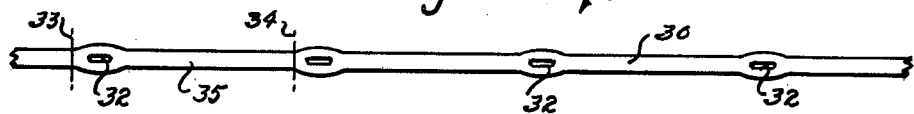
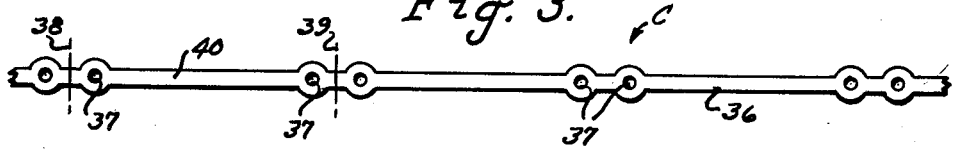
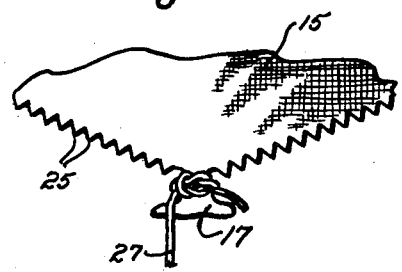
INVENTOR
Kenneth R. A. Wilson
BY
ATTORNEYS July 20, 1965
K. R. A. WILSON
3,195,842
PARACHUTE
Filed March 3, 1964
2 Sheets-Sheet 2
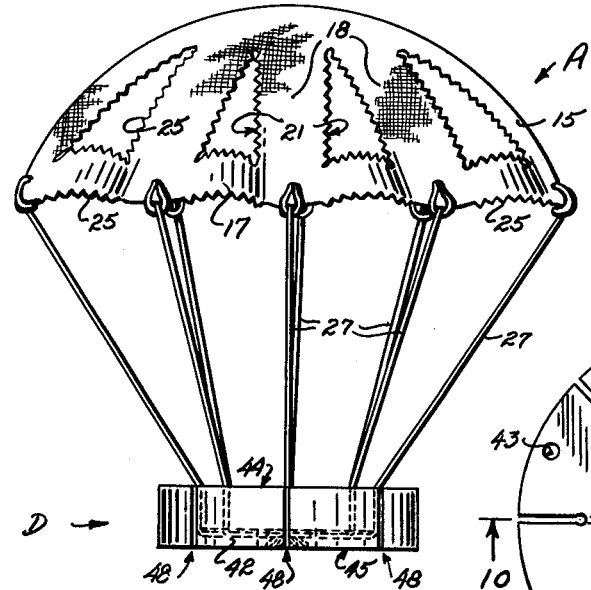
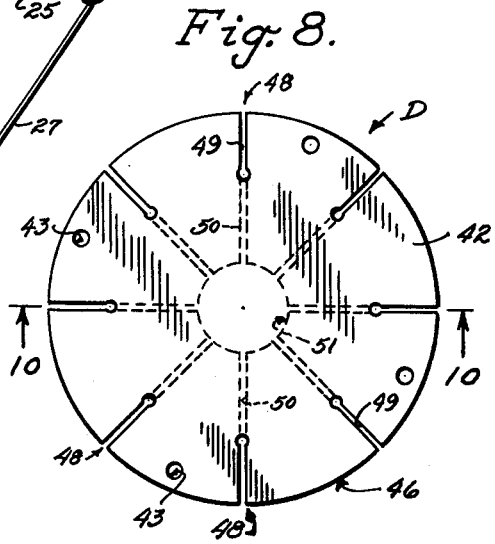
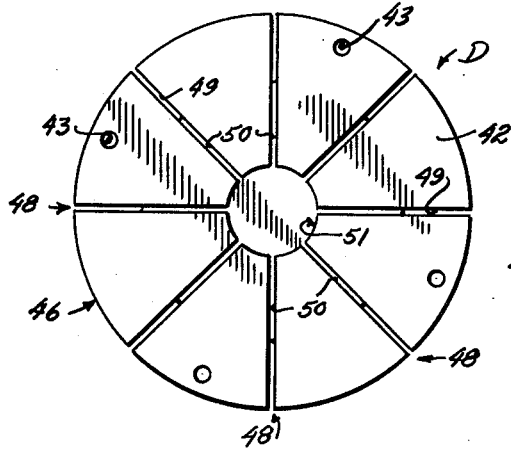
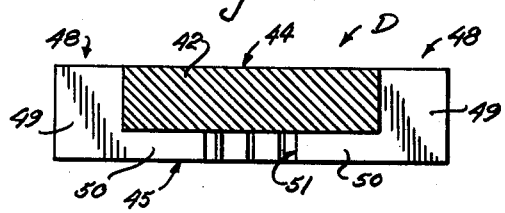
INVENTOR
Kenneth R. A. Wilson
BY
ATTORNEYS

United States Patent Office 3,195,842
Patented July 20, 1965

3,195,842
PARACHUTE
Kenneth R. A. Wilson, Sunland, Calif., assignor to Irving Air Chute Company, Inc., Lexington, Ky., a corporation of New York
Filed Mar. 3, 1964, Ser. No. 349,041
5 Claims. (Cl. 244—145)

This invention relates to parachutes and methods of making the same.

In the making of a parachute canopy, present procedures include use of a plurality of individual shaped panels which must be assembled as a unit, one with respect to the other, with adjoining edges overlapped in a seam which is then sewn together to form a complete canopy. This method of making parachute canopies, including steps of assembling panels, folding seams and sewing, is extremely time consuming so that any parachute of which such canopy is a part must be considerably expensive. This method of manufacturing a parachute canopy has been followed with respect to parachutes provided for human use, and likewise parachutes adapted to support small objects, such as flares and the like. Such flare parachutes have thus been quite expensive.

The primary object of this invention is the provision of a parachute canopy which can be produced inexpensively, and a method of making the same so that uniform production is possible, with a minimum of manufacturing steps, in quantities not possible with previously followed technology and production methods.

A further object is the provision of a one-piece canopy for parachutes which does not require the plurality of seams and joints of parachute canopies manufactured according to present practices, thus providing a parachute canopy having a drag producing surface with improved total reliability and strength characteristics.

A further object is the provision of a one-piece parachute canopy in which the ratio of the porosity of the material of which the canopy is made to the area of the vent openings therein may be directly computed, without giving consideration to the seams, joints and stitching such as is necessary with resect to previously provided canopies, so that drag efficiency and stability characteristics of the canopy can be accurately determined.

A further object is the provision of improved shroud lines adapted to be interconnected with facility and at a rate commensurate with the mass production of parachutes.

A further object is the provision of an improved suspended weight member for flare parachutes.

Other objects and advantages of the invention will be apparent during the course of the following detailed description, taken in connection with the accompanying drawings, forming a portion of this specification, and in which drawings:

FIG. 1 is a top plan view of the improved parachute canopy.

FIG. 2 is a plan view of one form of preformed shroud line which may be used in connection with the canopy of FIG. 1.

FIG. 3 is a modified form of shroud line.

FIGS. 4, 5 and 6 are enlarged fragmentary views showing various methods of attaching shroud lines to the improved parachute canopy.

FIG. 7 is a side elevation of a parachute made according to this invention.

FIG. 8 is a top plan view of the improved suspended weight member of the parachute of FIG. 7.

FIG. 9 is a bottom plan view of the suspended weight member of FIG. 8.

FIG. 10 is a transverse sectional view taken substantially on the line 10—10 of FIG. 8.

In the drawings, wherein for the purpose of illustration are shown preferred and modified embodiments of the invention, and wherein similar reference characters designate corresponding parts throughout the several views, the letter A may generally designate the improved parachute canopy; B the shroud lines of FIG. 2; C the modified shroud lines of FIG. 3; and D the suspended weight member of FIGS. 7–10.

Canopy A preferably includes a body portion 15 which is of a material of sufficient porosity and strength for serving as a canopy for a parachute, for instance, a woven natural fabric or a synthetic fabric. Muslin cloth has been found to be suitable for body portion 15.

Body portion 15 preferably includes a peripheral segment 17 and a plurality of radial segments 18 adjoining each other in such a manner as to define a plurality of triangular sections 19 forming a drag producing surface in the shape of a flat regular polygon.

Each triangular section 19 preferably includes a triangular vent opening 21.

In the method of making this parachute canopy, which will be subsequently described, body portion 15 is one piece, without seams, hems or sewing of any sort. In order to prevent body portion 15 for becoming unraveled or separated adjacent the outermost peripheral edge thereof or adjacent the edges of vent openings 21, serrations 25 may be provided at these edges.

A certain porosity of a parachute canopy is necessary in order to provide efficient stability and drag efficiency characteristics. Inasmuch as body portion 15 is preferably of one-piece construction, without seams, joints, etc., and if it is desired to provide the same as a unit without vent openings 21 of other orifices therethrough, it is a relatively simple matter to compute the mechanical porosity of the same and to form the same of a material which will have the desired design total porosity. Likewise, inasmuch as no variations are required to be considered with respect to seams, joints, etc., in computing the porosity factor of the canopy, once the porosity of the material of which the canopy is made is known, the combined area of vent openings which must be provided for optimum efficiency, can be readily determined. For optimum porosity characteristics, the ratio of the combined area of the vent openings to the area of the complete polygon should equal the desired geometric porosity of the drag producing surface expressed as a proper fraction. In other words, porosity of the body portion plus the combined area of the vent openings is the design total porosity value. The desired design total porosity value for required performance of the canopy in terms of either drag, or stability, or both, may thus be readily computed and provided.

Although I have shown and described body portion 15 as forming a drag producing surface in the shape of a flat regular polygon, and vent openings 21 as being triangular, it is obvious that the canopy may be shaped in any suitable form and that the vent openings may be inscribed either regularly or irregularly therein.

Peripheral segment 17 of body portion 15 may be provided with a plurality of spaced apart openings 26 for attachment of shroud lines 27 thereto. As shown in FIGS. 4 and 5, grommets 28 may be provided for opening 26 for strengthening attachment of shroud lines 27 to the canopy. As shown in FIG. 6, openings 26 are not absolutely necessary, it being feasible to attach shroud lines 27 about a portion of peripheral segment 17.

Shroud lines B are preferably performed, as an elongated flexible member 30 having spaced apart looped bright portions 32 at predetermined intervals therealong. It is anticipated that elongated flexible member 30 is made of nylon cord or other suitable material, as a continuous strand, having preformed looped bight portions 32 shaped therealong. In utilization of member 30 for individual shroud lines, the same will be cut as indicated at 33 and 34, so that each shroud line cut therefrom includes an elongated flexible portion 35 and a looped bight portion 32.

In attachment of such shroud line to the canopy, elongated flexible portion 35 may be passed through looped bight portion 32, as shown in FIG. 4, the end of elongated flexible portion 35 being attached to the device supported by the canopy, such as suspended weight member D.

Shroud lines C are preferably preformed as an elongated flexible member 36 having spaced apart looped bight portions 37 at predetermined intervals therealong. Elongated flexible member 36 is made of nylon or other suitable material, as a continuous strand, having preformed looped bight portions 37 spaced therealong. In utilization of member 36 for individual shroud lines, the same will be cut as indicated at 38 and 39, so that each shroud line cut therefrom includes an elongated flexible portion 40 having a looped bight portion 37 at each end thereof.

In attachment of such shroud line to a canopy, looped bight portion 37 provided at one end of elongated flexible member 40 may be utilized to connect the shroud line to the parachute canopy, in the same manner as above described with respect to shroud line B, and looped bight portion 37 at the opposite end of elongated flexible portion 40 may be attached to a suspended weight member D, as shown in FIG. 7.

Suspended weight member D is an improved unit which may be conveniently used in connection with flare type parachutes. Member D preferably includes a body portion 42 having a plurality of openings 43 therethrough for attachment of the flare elements to body portion 42.

Body portion 42 has opposed faces 44 and 45 and a peripheral edge 46. When the member D is suspended from a parachute canopy, such as shown in FIG. 7, face 44 thereof confronts the canopy.

Body portion 42 is provided with a plurality of radial slots 48. Radial slots 48 have a portion 49, adjacent peripheral edge 46, which extend through body portion 42, from face 44 to face 45; and a portion 50 extending from portion 49, along face 45 to a central recessed portion 51.

In attachment of shroud lines 27 to suspended weight member D, shroud lines 27 are received by radial slots 48, extending through portion 49 and along portion 50 thereof, and are interconnected within recessed portion 51, as shown in FIG. 7.

Insofar as making of the improved parachute canopy is concerned, the same may be cut from a single piece of material of sufficient size so that a one-piece canopy may be cut therefrom and of sufficient porosity and strength for serving as a canopy for the parachute; a plurality of canopies may be cut in a single operation from a plurality of pieces of material of sufficient size so that a one-piece canopy may be cut therefrom and of a sufficient porosity and strength for serving as a canopy for a parachute superposed one upon the other; and a plurality of canopies may be cut in a single operation from a continuous length of material of sufficient porosity and strength for serving as a canopy for a parachute folded in superposed layers, each layer being of a size sufficient for the cutting of a one-piece parachute canopy therefrom.

In the making of a parachute canopy from a single piece of material, selected as previously specified, the cutting operation includes a shaping of the outermost extremities of the canopy for providing a parachute canopy of the desired size and having the desired peripheral configuration. The preferred configuration is a flat polygon. In the vent that the canopy is to be provided with vent openings, the same are cut into the material at the same time as cutting of the canopy to the desired peripheral configuration. The size of the vent openings will be determined, as previously specified, for creating appropriate porosity in relation to the porosity of the material of the canopy, in providing stability for the parachute of which the canopy is to be a part.

Likewise, if openings are to be provided in the peripheral segment of the canopy for attachment thereto of shroud lines, the same will be cut at the same time as the cutting of the vent openings and shaping of the periphery of the canopy.

The periphery of the parachute canopy and the vent openings may be cut in a serrated manner, in the cutting operation.

In the event that a plurality of pieces of material or a plurality of superposed folded layers of material are to be cut in a single operation, the manufacturing steps will include the arranging of the material in a plurality of superposed layers in juxtaposition for simultaneous cutting of a plurality of one-piece parachute canopies therefrom.

Insofar as the cutting operation is concerned, I preferably provide for die cutting of the canopy, preferably by a "clicker" die machine. Cloth guides and high speed cloth laying racks may be utilized for arranging superposed layers of material when a plurality of canopies are to be cut in a single cutting operation.

Various changes in the shape, size, arrangement of parts, and method of manufacture may be made to the forms of the invention herein shown and described without departing from the spirit of the invention or the scope of the following claims.

I claim:

1. A canopy for a parachute including a body portion having a peripheral segment and a plurality of radial segments adjoining each other in juxtaposition to define a plurality of triangular sections forming a drag producing surface in the shape of a flat regular polygon, the peripheral edge of said body portion being provided with a plurality of serrations, and each triangular section including a triangular vent opening through said body portion, the ratio of the combined area of said triangular vents to the area of the complete body portion being the desired geometrical porosity of the drag producing surface expressed as a proper fraction.

2. A canopy for a parachute including a body portion having a peripheral segment and a plurality of radial segments adjoining each other in juxtaposition to define a plurality of triangular sections forming a drag producing surface in the shape of a flat regular polygon, each triangular section including a triangular vent opening through said body portion, the edges of said triangular vents being provided with a plurality of serrations and the ratio of the combined area of said triangular vents to the area of the complete body portion being the desired geometrical porosity of the drag producing surface expressed as a proper fraction.

3. A canopy for a parachute including a body portion having a peripheral segment and a plurality of radial segments adjoining each other in juxtaposition to define a plurality of triangular sections forming a drag producing surface in the shape of a flat regular polygon, each triangular section including a triangular vent opening through said body portion, the peripheral edge of said body portion and the edges of said triangular vents being provided with a plurality of serrations, and the ratio of the combined area of said triangular vents to the area of the complete body portion being the desired geometrical porosity of the drag producing surface expressed as a proper fraction.

4. In a parachute, a canopy including a body portion having a predetermined shape, a plurality of vent openings extending through said body portion, the ratio of the combined area of said vents to the area of the complete body portion being such as to provide the desired degree of porosity for air flow through the canopy; a plurality of shroud lines interconnected at one end thereof to said canopy; and a suspended member interconnected to the other end of said shroud lines, said suspended member including a body portion having opposed faces and a peripheral edge, one of said faces confronting said canopy, a recessed portion disposed centrally of the face of said body portion opposite the canopy confronting face thereof, and a plurality of radially extending slots, said slots extending from face to face of said body portion adjacent the peripheral edge thereof and along the face thereof opposite the canopy confronting face thereof to said recessed portion in juxtaposition for receiving said shroud lines through that portion of said radial slots extending from face to face of said body portion, along that portion of said radial slots extending along the face thereof opposite the canopy confronting face thereof, for interconnection within said recessed portion.

5. A weight member for attachment to the shroud lines of a parachute, said weight member including a body portion having opposed faces and a peripheral edge, a recessed portion disposed centrally of one face of said body portion, and a plurality of radially extending slots, said slots extending from face to face of said body portion adjacent the peripheral edge thereof and from thence along the face of said body portion having said recessed portion to said recessed portion in juxtaposition for receiving shroud lines through that portion of said slots extending from face to face of said body portion, along that portion of said slots extending long the face of said body portion having said recessed portion, and into said recessed portion.

References Cited by the Examiner
UNITED STATES PATENTS

| | | | |
|---|---|---|---|
| 1,834,370 | 12/31 | Askam | 244—145 |
| 2,072,600 | 3/37 | Lewis et al. | 244—142 |
| 2,309,107 | 1/43 | Giroux | 244—145 |
| 2,745,615 | 5/56 | Fogal | 244—145 |
| 2,950,887 | 8/60 | Hidding | 244—142 X |

FOREIGN PATENTS 471,994   6/52   Italy.

MILTON BUCHLER, *Primary Examiner.*

FERGUS S. MIDDLETON, *Examiner.*